United States Patent
Kim et al.

(10) Patent No.: US 7,835,277 B2
(45) Date of Patent: Nov. 16, 2010

(54) METHOD AND APPARATUS FOR MANAGING A BUFFER IN A COMMUNICATION SYSTEM

(75) Inventors: Ki-Back Kim, Seongnam-si (KR); Eun-Chan Park, Seongnam-si (KR); Han-Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 11/950,623

(22) Filed: Dec. 5, 2007

(65) Prior Publication Data

US 2008/0130670 A1  Jun. 5, 2008

(30) Foreign Application Priority Data

Dec. 5, 2006    (KR) ...................... 10-2006-0122434
Nov. 29, 2007   (KR) ...................... 10-2007-0122886

(51) Int. Cl.
*H04L 12/28* (2006.01)
(52) U.S. Cl. ...................... 370/230; 370/412
(58) Field of Classification Search ......... 370/229–235, 370/412–418
See application file for complete search history.

(56) References Cited

U.S. PATENT DOCUMENTS

| 5,583,792 | A * | 12/1996 | Li et al. ........................ 709/224 |
| 6,405,258 | B1 * | 6/2002 | Erimli et al. ................. 709/235 |
| 6,618,378 | B1 * | 9/2003 | Giroux et al. ............. 370/395.1 |
| 6,961,307 | B1 | 11/2005 | Aweya et al. |
| 2004/0071086 | A1 * | 4/2004 | Haumont et al. ............. 370/230 |
| 2004/0160971 | A1 | 8/2004 | Krause et al. |
| 2006/0018277 | A1 * | 1/2006 | Petrovic et al. ............. 370/329 |
| 2007/0041390 | A1 * | 2/2007 | Tatar et al. .................... 370/412 |
| 2009/0279558 | A1 * | 11/2009 | Davis et al. .................. 370/412 |

FOREIGN PATENT DOCUMENTS

| KR | 10-1999-0087972 A | 12/1999 |
| KR | 10-2007-0050579 A | 5/2007 |

* cited by examiner

*Primary Examiner*—Aung S Moe
*Assistant Examiner*—Kerri M Rose
(74) *Attorney, Agent, or Firm*—Jefferson IP Law, LLP

(57) ABSTRACT

A method and apparatus for managing a buffer of a Radio Access Station (RAS) in a communication system are provided. An available buffer space determiner sets a threshold for each service class for scheduling packet input/output of the buffer according to priority of a service class, estimates and stores, upon receipt of a packet at the buffer, an available space size of the buffer after the packet reception, compares the estimated available space size of the buffer with a first threshold corresponding to a first service class indicative of a service class of the packet, and schedules packet input/output of the buffer according to the comparison result. A processor module schedules packet input/output of the buffer according to an output of the available buffer space determiner. The present invention can improve quality of services through service differentiation based on priorities of service classes and buffer management based on characteristics of the corresponding service traffics.

18 Claims, 9 Drawing Sheets

METHOD AND APPARATUS FOR MANAGING A BUFFER IN A COMMUNICATION SYSTEM

PRIORITY

This application claims the benefit under 35 U.S.C. §119 (a) of a Korean patent application filed in the Korean Intellectual Property Office on Dec. 5, 2006 and assigned Serial No. 2006-122434 and of a Korean patent application filed in the Korean Intellectual Property Office on Nov. 29, 2007 and assigned Serial No. 2007-122886, the entire disclosures of both of which are hereby incorporated by reference.

BACKGROUND OF THE INVENTION

1. Field of the Invention

The present invention relates to a method and apparatus for managing a buffer in a communication system. More particularly, the present invention relates to a method and apparatus for managing a buffer according to a priority of service in a communication system.

2. Description of the Related Art

The present invention will be described herein with reference to an IEEE 802.16 Wireless Metropolitan Area Network (WMAN)-based Broadband Wireless Access (BWA) system as an example of the communication system.

The BWA system, also known as a Mobile WiMAX system, can wirelessly provide various multimedia services such as Internet access service, high-speed data service, and video service as well as voice service by means of portable terminals anytime and anywhere, independent of whether the users are moving or stationery. Compared with the conventional cellular mobile communication network, the Mobile WiMAX system provides faster wireless data services at lower cost. In addition, the Mobile WiMAX system, because it has broad service coverage area and low interference, can enable high-speed services even while the users are on the move. Therefore, the Mobile WiMAX system has attracted public attention as the next generation wireless communication technology capable of meeting the increasing users' demand for wireless Internet services.

The services provided by the Mobile WiMAX system can be classified into Unsolicited Grant Service (UGS), Extended Real-Time Variable Rate (ERT-VR) service, Real-Time Variable Rate (RT-VR) service, Non-Real-Time Variable Rate (NRT-VR) service, and Best Effort (BE) service according to the service requirements. The UGS, a service for allocating resources of a predetermined size by periods, is suitable for applications such as Voice over Internet Protocol (VoIP). The RT-VR service is introduced to support real-time applications that generate, like video streaming, variable-size packets by periods. The ERT-VR service is a service that can efficiently use the limited wireless resources, compared with the UGS, by repeating an operation of periodically allocating predetermined resources when there are packets to transmit, and allocating no resource or fewer resources when there is no packet to transmit. The NRT-VR service is suitable for service of non-real-time applications requiring the minimum data transfer rate (or data rate). The BE service basically requires no service level. To satisfy qualities of the services having the different requirements, different types of scheduling and resource management/allocation mechanisms have been realized according to the service classes.

FIG. 1 illustrates a configuration of a conventional communication system.

Referring to FIG. 1, the communication system includes a subnet #1 150, a subnet #2 160, a core network 120 for connecting the subnets #1 and #2 to each other, a Public Switched Telephone Network (PSTN) 122 connected to the core network 120, and the Internet 124.

The subnet #1 150 includes an Access Control Router (ACR) #1 100, Radio Access Stations (RASs) #1~#4 (102, 104, 106 and 108), and a Mobile Station #1 110, and the subnet #2 160 includes an ACR#2 130, RASs #5~#8 (132, 134, 136 and 138), and a Mobile Station #2 140. Here, the link (or direction) from the ACR to the Mobile Station via the RAS is called a 'downlink', and the opposite link is called an 'uplink'. The uplink/downlink services guarantee Quality of Service (QoS) through their own algorithms, and a description of the present invention will be limited herein to the downlink.

FIG. 2 illustrates an internal structure of the conventional RAS.

Referring to FIG. 2, a channel card 200 of the RAS generally includes a processor module 202, an interface buffer 204, and a modem module 206.

Downlink packets in the RAS are serviced through the following process.

The processor module 202 buffers the packets received from the ACR in a temporary storage buffer 208 separately for each connection, and stores (or writes) the packets stored in the temporary storage buffer 208, in the interface buffer 204 through interaction between a Network Processor Unit (NPU) 210.

The packets stored in the interface buffer 204 are wirelessly transmitted or read after being scheduled by the modem module 206. The modem scheduler 214 calculates scheduling priorities of the packets taking into account the service requirement, the channel environment, and the fairness for each connection in the interface buffer 204. The modem scheduler 214 selects the connection having the highest priority, and services packets of the corresponding connection. To improve service quality of the real-time service, the real-time service is assigned a higher priority as compared to the non-real-time service, and thus transmission delay is reduced by servicing the packets quickly.

The processing rate of the processor module 202 is higher than the data rate of the wireless channel. Also, the link capacity between the ACR and the RAS is much higher than the wireless channel capacity. In addition, a low-price high-capacity memory is generally used as a buffering memory of the temporary storage buffer 208 in the processor module 202, while a high-speed low-capacity memory such as a Dual Port Random Access Memory (DPRAM) that can simultaneously perform read and write operations at an accurate time is used as the interface buffer 204. That is, in the downlink packet flow, because the interface buffer 204 is a bottleneck point, the service quality depends greatly on the buffer management technique.

Specifically, the modem scheduler 214 performs scheduling taking into account the service requirement of each connection during wireless packet transmission, such that the packets are output in order of priority. However, when the packets from the storage buffer 208 are stored in the interface buffer 204, the NPU 210 simply performs scheduling on each connection using a round-robin scheme. The round-robin scheme sequentially outputs the packets stored in the temporary storage buffer 208 to the interface buffer 204 one by one. However, the modem module 206 outputs the packets from the interface buffer 204 in order of the packet having the higher service priority. Therefore, because packets having a lower service priority, like the packets of the BE service, reside in the interface buffer 204 longer than the packets of higher priority. Packets having a lower service priority may occupy the entire buffer, there is a lack of available space for packets having a higher service priority, for example, packets of the UGS and NRT-VR service, thus causing a possible delay or packet loss in serving high-priority packets.

That is, the higher-service priority packets in the interface buffer 204 are preferentially serviced by the modem scheduler 214, compared to the lower-service priority packets. Accordingly, the higher-service priority packets in the interface buffer 204 are output at a higher rate compared to the lower-service priority packets. However, the packets flowing into the interface buffer 204 are input separately for each connection and are input on a round-robin basis regardless of the service priority. Therefore, a difference between packet input and output rates of the interface buffer 204 occurs. As time goes by, the quantity of higher-service priority packets may be reduced in the interface buffer 204 little by little so that all available spaces of the interface buffer 204 are fully filled only with the lower-service priority BE service packets.

When there is a lack of available space in the buffer, the packet inflow is delayed until there is an available space, in order to prevent overflow of the buffer. In this case, because there is no available space in the buffer, even the higher-priority packets are delayed until the BE service packets in the buffer are serviced out.

In the interface buffer management technique based on the round-robin scheme, the services may undergo priority inversion, so the service quality may deteriorate and the services for higher-priority packets may not be guaranteed.

SUMMARY OF THE INVENTION

An aspect of the present invention is to address at least the above-mentioned problems and/or disadvantages and to provide at least the advantages described below. Accordingly, an aspect of the present invention is to provide a method and apparatus for providing differentiated interface buffer management according to the priority of a service class in a communication system.

Another aspect of the present invention is to provide a method and apparatus for setting a threshold for each service class, comparing an available space size of a buffer with the threshold, and scheduling a corresponding service according to the comparison result.

Another aspect of the present invention is to provide a method and apparatus for setting a hysteresis threshold or timer to prevent unnecessary switching between service stop and service restart (or service replay).

Another aspect of the present invention is to provide a method and apparatus in which, if an RAS fails to receive a Service Stop/Restart Response message within a predetermined time after transmitting a Service Stop/Restart message, the RAS retransmits the Service Stop/Restart message.

According to one aspect of the present invention, a method for managing a buffer of a Radio Access Station (RAS) in a communication system is provided. The buffer management method includes setting a plurality of thresholds for each of a plurality of service classes, respectively, upon receipt of a packet at the buffer, estimating and storing an available space size of the buffer after the packet reception, comparing the estimated available space size of the buffer with a first of the plurality of thresholds corresponding to a first service class indicative of the service of the packet, and scheduling packet input/output of the buffer according to the comparison result.

According to another aspect of the present invention, an apparatus for managing a buffer of a Radio Access Station (RAS) in a communication system is provided. The buffer management apparatus includes an available buffer space determiner for setting a plurality of thresholds for each of a plurality of service classes, respectively, for estimating and storing, upon receipt of a packet at the buffer, an available space size of the buffer after the packet reception, for comparing the estimated available space size of the buffer with a first of the plurality of thresholds corresponding to a first service class indicative of the service of the packet, and scheduling packet input/output of the buffer according to the comparison result and a processor module for scheduling packet input/output of the buffer according to an output of the available buffer space determiner.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a method and apparatus for setting a virtual dedicated buffer space of an interface buffer separately for each service class, and serving packets in a differentiated way according to the size of an available space of the buffer. The present invention also provides a method and apparatus for determining a size of the buffer according to the requirement of each service class. The apparatus to which the buffer allocation technology is applied is assumed herein as an RAS. However, the buffering scheme proposed by the present invention can be applied not only to an RAS but also to other buffering-required apparatus in the same way. An exemplary embodiment of the present invention determines a threshold where an available space of the buffer has an optimal size, separately for each service class. Another exemplary embodiment of the present invention compares a threshold for each service class with a change in available space size of the buffer, and sets a hysteresis threshold or timer according to the comparison result to reduce unnecessary switching between service stop and service restart (or service replay) for the corresponding service. The proposed apparatus stops/restarts the corresponding service according to either of the illustrated exemplary embodiments.

Figure 1:
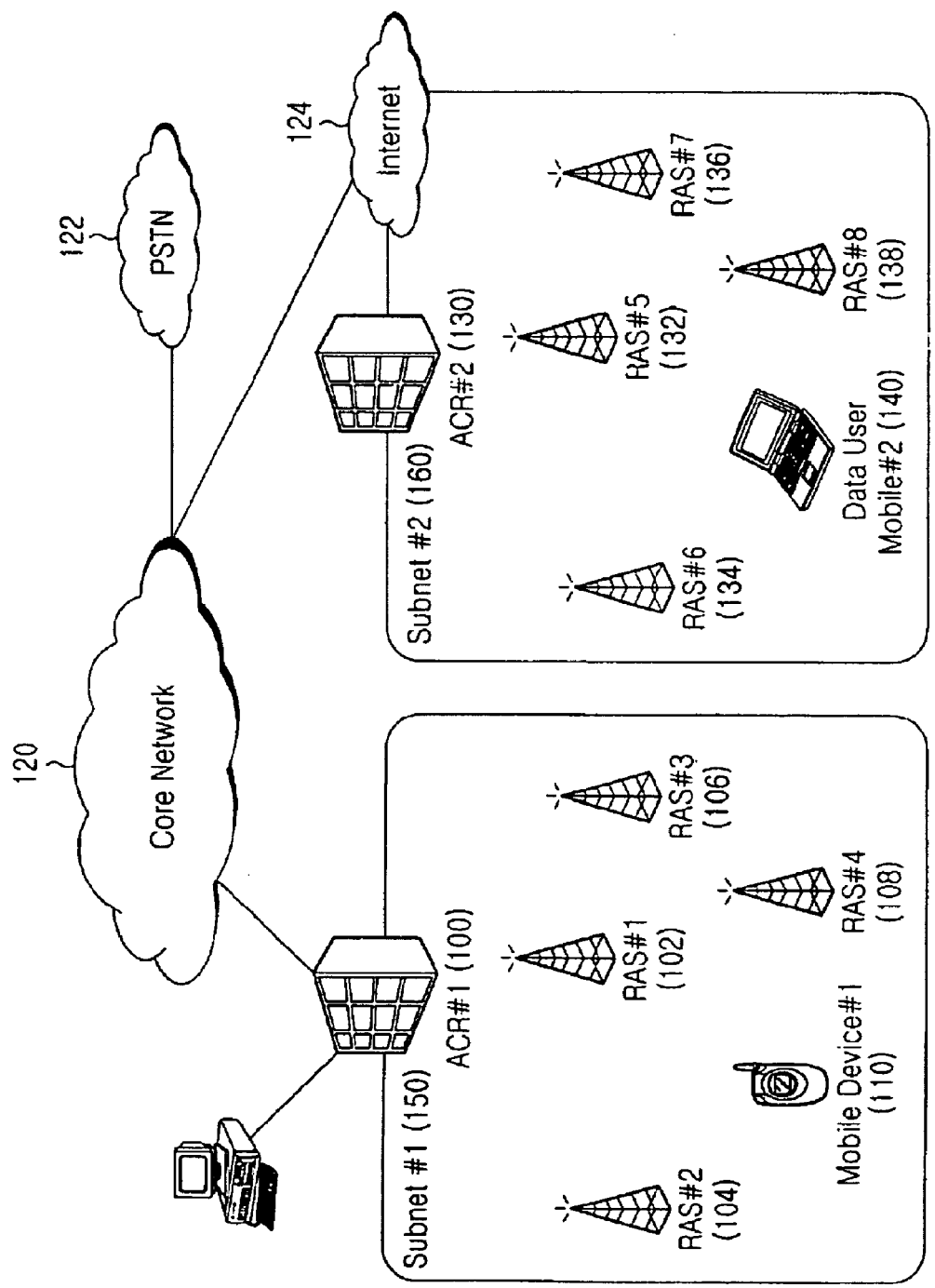
FIG. 1 illustrates a configuration of a conventional communication system.
Figure 2:
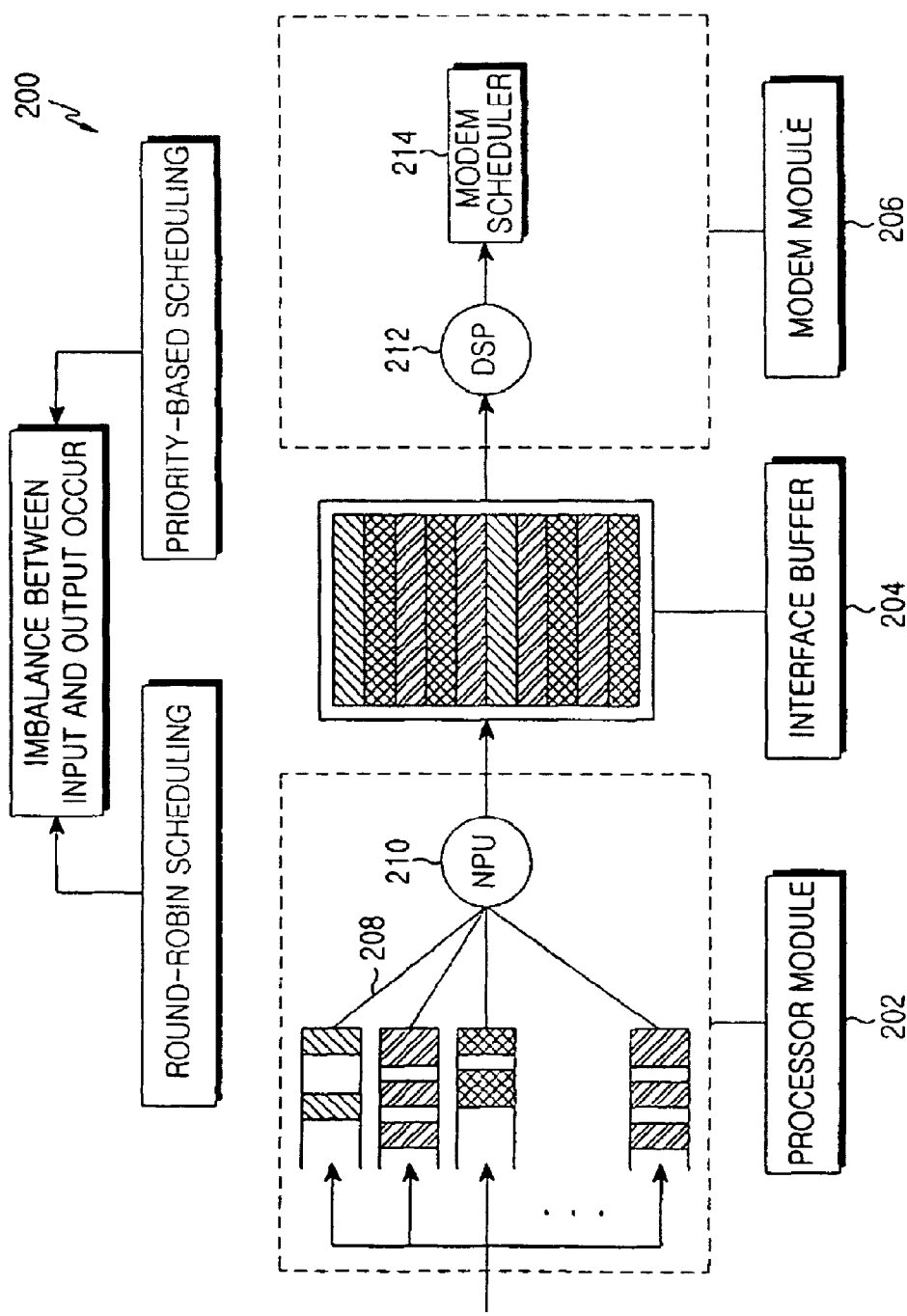
FIG. 2 illustrates an internal structure of a conventional RAS.
Figure 3:
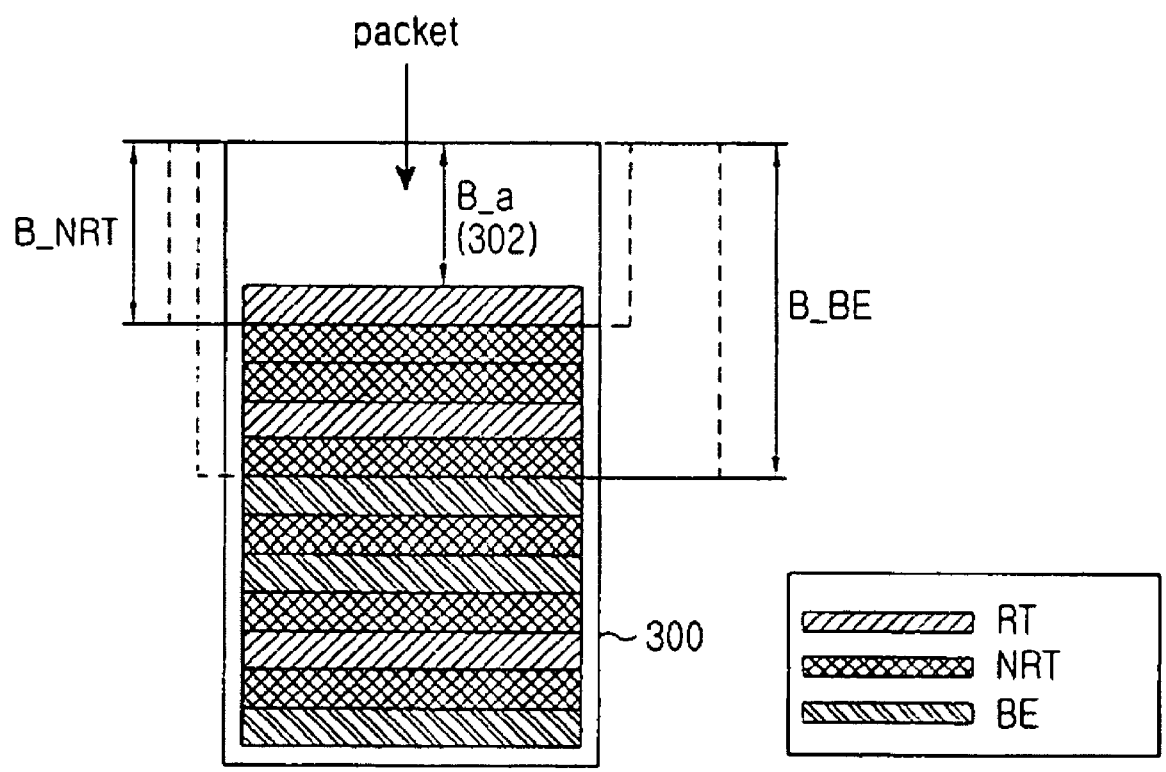
FIG. 3 illustrates the management of an interface buffer according to an exemplary embodiment of the present invention.

FIG. 3 illustrates the management of an interface buffer according to an exemplary embodiment of the present invention. A description of the management will be described herein for three types of service classes: RT service class susceptible to the time delay, NRT service class having the high priority regardless of the time delay, and BE service class having no service requirement. It is assumed that UGS, RT-VR service and ERT-VR service classes are mapped to the RT service class.

Referring to FIG. 3, an optimal threshold for each service class is set in the following manner.

A size of the available space in the entire interface buffer 300 is defined a B_a 302, and thresholds for the RT, NRT, BE service classes are defined as B_RT, B_NRT, and B_BE, respectively. The B_RT, the B_NRT and the B_BE are reference values used for determining whether to input/output the packets for the corresponding service classes.

The priorities of the service classes are in order of 'RT>NRT>BE'. In this case, the thresholds of the service classes are set in order of 'B_RT<B_NRT<B_BE'. The thresholds of the service classes are set using an appropriate Call Admission Control (CAC) algorithm determined considering the required capacity for the corresponding service classes and the data rate of the wireless channel.

First, because the RT has the highest priority, a value of the B_RT is set to '0' order to avoid stopping the service as long as there is any available space in the interface buffer. Second, the B_NRT is set to protect the traffic of the RT service class by securing the virtual dedicated buffer space for the RT service class. That is, the buffer capacity required for stable service of the RT service class should be calculated, and it should be set as a value of the B_NRT. Thereafter, if the B_a 302 is less than the set value of the B_NRT, the NPU 210 stops the NRT service and the BE service to protect the traffic of the RT service class.

Finally, the B_BE is set to the value used for securing the virtual dedicated buffer space of the RT service class and the NRT service class having higher priority than the BE service class and protecting the traffic of the RT service class and the NRT service class. That is, the buffer capacity required for the RT and NRT service classes should be calculated, and it should be set as a value of the B_BE. Thereafter, if the B_a 302 drops below the B_BE, the BE service is stopped, and only the NRT and RT service classes are serviceable.

A detailed description will be made of an exemplary procedure for determining corresponding service classes whose packets are allowed to flow into the interface buffer 300, according to the size of the B_a 302 and the thresholds of the service classes, using Equation (1) to Equation (3).

$$0 < B\_a \leq B\_NRT \quad (1)$$

That is, if the B_a 302 is greater than 0, and less than or equal to B_NRT, only the packets of the RT service class can flow into the interface buffer 300.

$$B\_NRT < B\_a \leq B\_BE \quad (2)$$

That is, if B_a 302 is greater than B_NRT, and less than or equal to B_BE, only the packets of the RT and NRT service classes can flow into the interface buffer 300.

$$B\_a > B\_BE \quad (3)$$

That is, if the B_a 302 is greater than B_BE, all packets can flow into the interface buffer 300.

A description will now be made of an exemplary method for setting thresholds of the service classes according to the present invention.

A description will first be made of a detailed example of setting a threshold for the NRT service class, required for the RT service class.

First, the buffer capacity required to serve the UGS should be determined. Herein, the data rate, though it is different according to the voice codec in use, is for VoIP whose full data rate does not exceed 100 Kbps in most cases. In view of the fact that a sampling period of the VoIP packets is approximately 20 ms and additional time delay may occur due to factors such as jitter, if it is assumed in this example that an inter-packet transmission interval is 40 ms. Then, the buffer size required for one VoIP connection, because it is a product of the full data rate and the inter-packet transmission interval, is calculated as shown in Equation (4).

$$100 \text{ Kbps} * 40 \text{ ms} = 12.5 \text{ Kbyte/s} * 40 \text{ ms} = 500 \text{ blocks} \quad (4)$$

Assuming that the basic unit of the interface buffer is a 576-byte block, one buffer block is required per VoIP connection. Because the interface buffer is managed separately for each channel card, the buffer capacity should be calculated separately for each channel card.

For example, the maximum number of VoIP flows allowable by the CAC algorithm in the Mobile WiMAX system is approximately 60 VoIP flows per subcell. If it is assumed herein that each channel card has 3 subcells, the buffer capacity required per channel card is calculated using Equation (5).

$$1 \text{ block/flow} * 60 \text{ flows/subcell} * 3 \text{ subcells/channel card} = 180 \text{ blocks} \quad (5)$$

Second, the buffer capacity required to serve the RT-VR service and the ERT-VR service should be determined.

When the CAC algorithm is applied to the RT-VR and ERT-VR services considering the average downlink subcell throughput of the Mobile WIMAX system, the maximum number of acceptable flows having an average data rate of 256 Kbps is approximately 10 per subcell, and the maximum number of acceptable flows having an average data rate of 64 Kbps is approximately 40 per subcell. If the time delay from the time that packets flow into the interface buffer until they are serviced through a modem scheduler is assumed to be 20 ms, the data rate of acceptable flows per block of the buffer is calculated using Equation (6).

$$576 * 8 \text{ bits}/20 \text{ ms} = 230 \text{ Kbps} \quad (6)$$

Assuming that the data rate required from the application programs of the RT-VR service or the ERT-VR service is approximately 64 Kbps~1 Mbps, when the data rate of the flows are 64 Kbps, the number of acceptable flows is maximized, requiring the maximum buffer capacity. In this case, the total buffer capacity required for servicing 40 flows per subcell is calculated using Equation (7).

$$1 \text{ block/flow} * 40 \text{ flows/subcell} * 3 \text{ subcells/channel card} = 120 \text{ blocks} \quad (7)$$

If both the UGS and the RT-VR (or ERT-VR) services are considered, the entire block size required for the RT service, because it is a sum of 180 blocks and 120 blocks, is calculated as 300 blocks.

Third, a description will be made of an example of setting a threshold for the BE service class, required for the RT service and the NRT service. The total buffer capacity required by the RT service class is assumed herein to be the calculated 300 blocks.

In servicing packets of the NRT service class, when the CAC algorithm is applied considering the average downlink subcell throughput, the number of acceptable flows per subcell increases with a decrease in the required data rate of the flows. For example, the maximum number of acceptable flows having an average data rate of 64 Kbps is approximately 100 per subcell. Therefore, the buffer capacity required for the NRT service is calculated using Equation (8).

$$1 \text{ block/flow} * 100 \text{ flows/subcell} * 3 \text{ subcells/channel card} = 300 \text{ blocks} \quad (8)$$

Through the foregoing calculation process, in the interface buffer, B_BE is set to 600 blocks, because the 300-block dedicated space for the RT service class and the 300-block dedicated space for the NRT service class are needed.

Thereafter, using Equation (5) to Equation (8), the buffer capacity for satisfying the service requirements of the UGS, RT, and NRT service classes can be obtained. In this case, the total size of the interface buffer should be greater than at least the sum of the calculated buffer sizes for the service classes. That is, as the buffer size is set greater than the B_BE, the services of the UGS, RT, and NRT service classes are fully guaranteed.

A description will now be made of a signal processing method for service stop/restart according to exemplary embodiments of the present invention.

Figure 4:
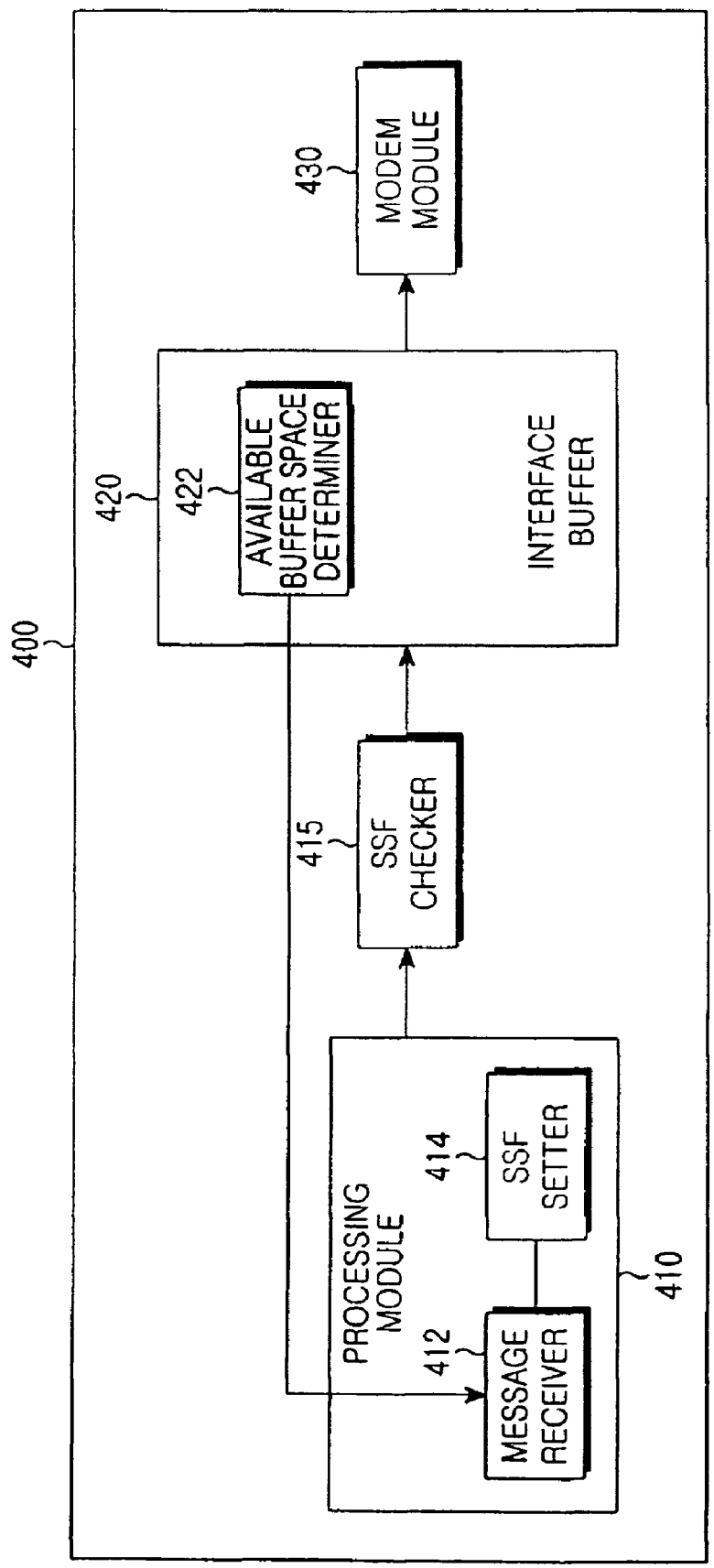
FIG. 4 illustrates an internal structure of a RAS according to an exemplary embodiment of the present invention.

FIG. 4 illustrates an internal structure of a RAS according to an exemplary embodiment of the present invention.

Referring to FIG. 4, a channel card 400 of the RAS generally includes a processor module 410, a Service Stop Flag (SSF) checker 415, an interface buffer 420, and a modern module 430. The processor module 410 includes a message receiver 412 and an SSF setter 414, and the interface buffer 420 includes an available buffer space determiner 422. A description of the RAS structure will be made herein for an exemplary case where the downlink packets serviced in the RAS are processed.

The available buffer space determiner 422 estimates a size of an available space of the interface buffer 420 every time a received packet is input/output. If the size is less than a particular threshold set separately for the corresponding service class, the available buffer space determiner 422 generates a Service Stop message to stop the inflow of the packets of the corresponding service class. That is, the available buffer space determiner 422 compares the size of the available space of the interface buffer 420 with a threshold at the time the packets of the particular service class are flowed into the interface buffer 420. As a result of the comparison, if the size of the available space is less than the threshold, the available buffer space determiner 422 transmits a Service Stop message of the corresponding service class to the message receiver 412 over a separate signaling channel.

When the processor module 410 receives a Service Stop Indication message, the SSF setter 414 sets an SSF of the corresponding service class to 'ON', and transmits a Service Stop Response message to the available buffer space determiner 422. Upon failure to receive the Service Stop Response message for a present time, the available buffer space determiner 422 retransmits the Service Stop message to the message receiver 412.

When packets are transmitted from the processor module 410 to the interface buffer 420 separately for each connection on a round-robin basis, the SSF checker 415 determines an SSF of the corresponding connection's service class. As a result of the determination, if the SSF of the service class is set to 'ON', the processor module 410 determines, without transmitting packets of the corresponding connection, a service class of another connection according to the round-robin order, and transmits packets of the higher-priority service class to the interface buffer 420.

At the time the packets of a particular service class are serviced, if an SSF of the corresponding service class is previously set and a size of an available space of the interface buffer 420 is greater than a threshold, the available buffer space determiner 422 transmits a Service Restart message for releasing the service stop of the corresponding service class, over the particular signaling channel. Upon receipt of the Service Restart message, the message receiver 412 allows the SSF setter 414 to set an SSF of the corresponding service class to 'OFF' and to transmit a Service Restart Response message to the available buffer space determiner 422. Upon failure to receive the Service Restart Response message for a predetermined time, the available buffer space determiner 422 retransmits the Service Stop Indication message to the message receiver 412.

In another exemplary embodiment of the present invention, the available buffer space determiner 422 estimates a size of an available space of the interface buffer 420 every time a received packet is input/output, and compares the estimated size of the available space with a value obtained by adding or subtracting a hysteresis threshold (or delta) to/from a particular threshold set separately for a corresponding service class.

If the estimated size of the available space is less than the value obtained by subtracting the delta from the particular threshold set separately for the corresponding service class, the available buffer space determiner 422 transmits a Service Stop message for the corresponding service class to the message receiver 412 over a separate signaling channel, to stop the inflow of the packets of the corresponding service class.

However, if the estimated size of the available space is greater than the value obtained by adding the delta to the threshold, the available buffer space determiner 422 transmits a Service Restart message for releasing the service stop of the corresponding service class to the message receiver 412 over the particular signaling channel, to restart the inflow of the packets of the stopped service. The delta is a threshold which is set to prevent the unnecessary repeated switching between the service stop and the service restart when there is little difference between the estimated size of the available space and the particular threshold for the corresponding service class. The delta can be set as either a different value or an equal value for each service class.

For example, if the estimated size B_a changes around B_BE (or B_NRT), the B_a does not change the service stop/restart state within the scope of Equation (9).

$$B\_BE - \text{delta} < B\_a < B\_BE + \text{delta} \quad (9)$$

In another exemplary embodiment of the present invention, the available buffer space determiner 422 estimates a size of an available space of the interface buffer 420 every time a received packet is input/output and compares the estimated size of the available space with a particular threshold set separately for the corresponding service class. If the estimated size of the available space approaches the threshold, the available buffer space determiner 422 sets a timer to prevent the unnecessary repeated transmission of the Service Stop/Restart messages. That is, if the time, for which the estimated size of the available space changes to the scope being not much different from the threshold is less than the time set in a Stop timer for determining a service stop time and a Restart (or Replay) timer for determining a restart time of the corresponding service, the available buffer space determiner 422 can prevent the unnecessary service stop/restart switching, or the unnecessary Service Stop/Restart message transmission.

The timer can be set to a multiple of frame duration, which is the unit duration of a Radio Frequency (RF) scheduler, or can be set to a predetermined time regardless of the service class. Otherwise, the timer can be set to a different value separately for each service class.

Specifically, if the estimated size of the available space is less than the threshold, the available buffer space determiner 422 stops the corresponding service when the time for which the estimated size of the available space stays in the state where it is less than the threshold is greater than or equal to the time previously set in the Stop timer. Thereafter, the available buffer space determiner 422 transmits a Service Stop message of the corresponding service class to the message receiver 412 over a separate signaling channel.

However, if the estimated size of the available space is greater than the threshold, the available buffer space determiner 422 restarts the corresponding service when the time for which the estimated size of the available space stays in the state where it is greater than the threshold is greater than or equal to the time previously set in the Restart timer. Thereafter, the available buffer space determiner 422 transmits a Service Restart message for the corresponding service class to the message receiver 412 over a separate signaling channel.

Figure 5:
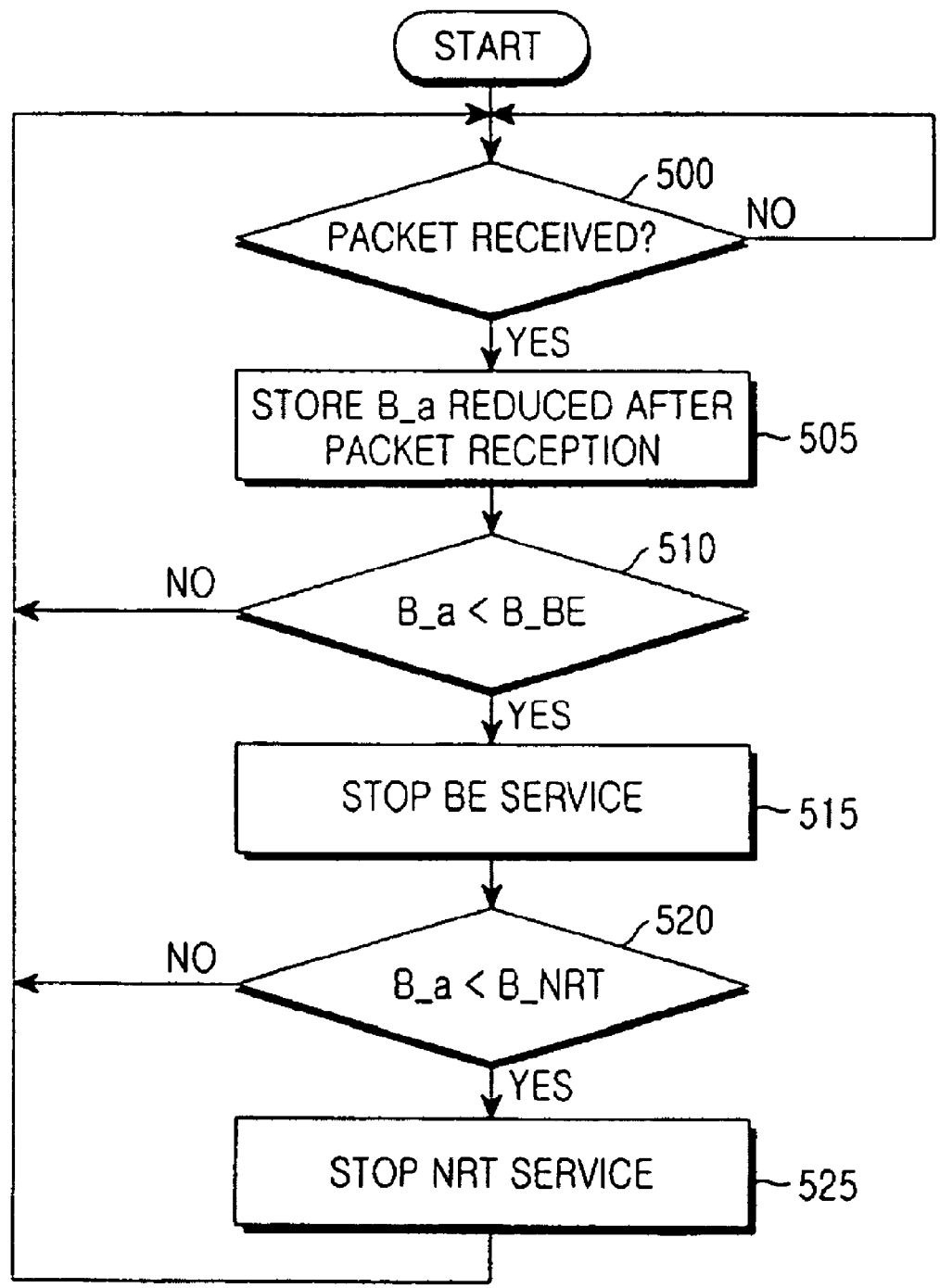
FIG. 5 illustrates an operation of an available buffer space determiner performed when a packet is input to an interface buffer according to an exemplary embodiment of the present invention.

FIG. 5 illustrates an operation of an available buffer space determiner performed when a packet is input to an interface buffer according to an exemplary embodiment of the present invention.

Referring to FIG. 5, if an interface buffer has a packet received from a processor module in step 500, the interface buffer estimates and stores a size B_a of an available buffer space reduced after the receipt of the packet in step 505.

The interface buffer determines in step 510 whether the size B_a is less than a preset threshold B_BE. If B_a is less than B_BE, the interface buffer stops the BE service, i.e., stops the packet inflow for the BE service class in step 515. However, if B_a is greater than or equal to B_BE, the interface buffer continues the packet inflow for the BE service class.

The interface buffer determines in step 520 whether the size B_a is less than a preset threshold B_NRT. If B_a is less than B_NRT, the interface buffer stops the NRT service, i.e. stops the packet inflow for the NRT service class in step 525, and then returns to step 500. However, if B_a is greater than or equal to B_NRT, the interface buffer continues the packet inflow for the NRT service class.

Figure 6:
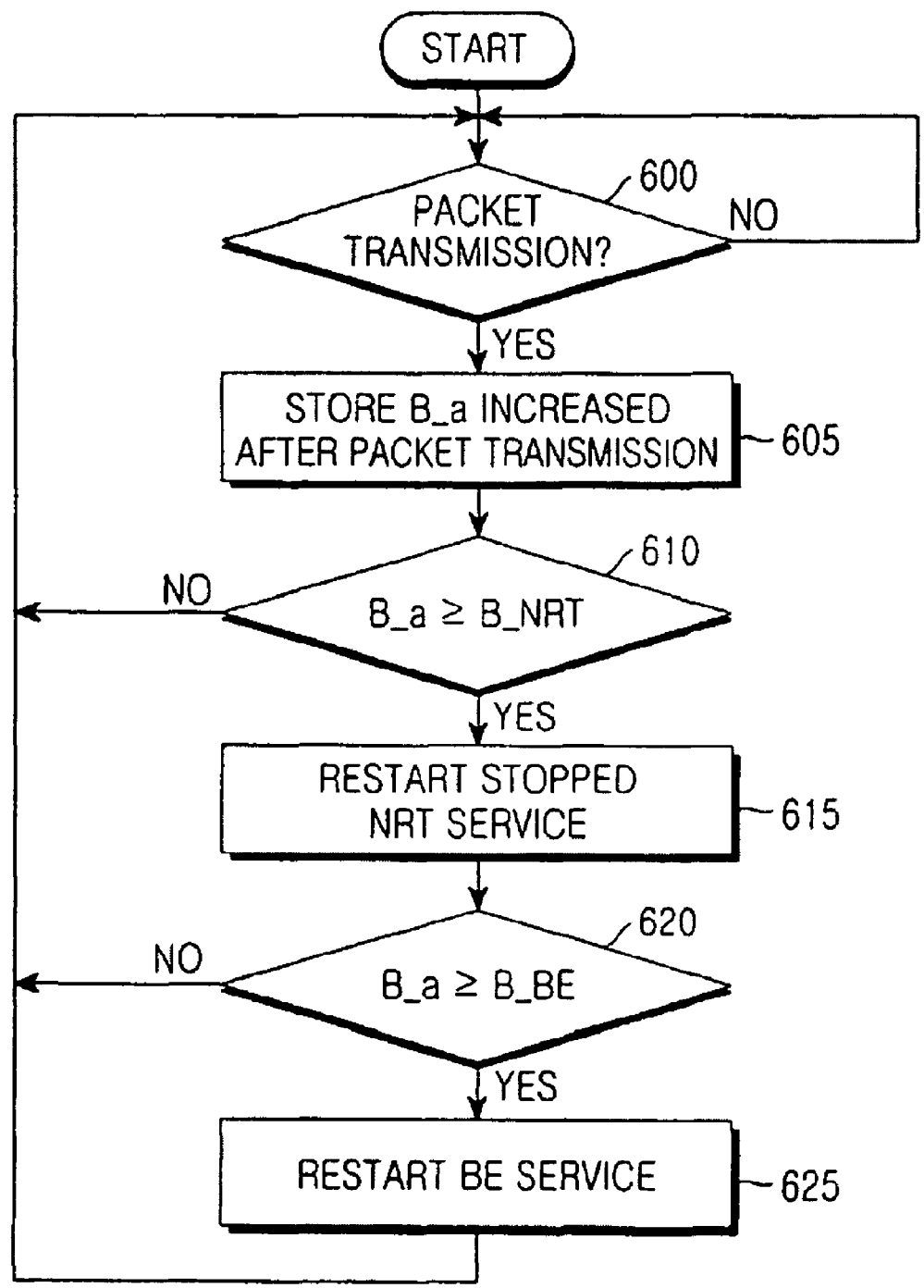
FIG. 6 illustrates an operation of an available buffer space determiner performed when a packet is output to an interface buffer according to an exemplary embodiment of the present invention.

FIG. 6 illustrates an operation of an available buffer space determiner performed when a packet is output to an interface buffer according to an exemplary embodiment of the present invention.

Referring to FIG. 6, if an interface buffer has a packet to transmit in step 600, and interface buffer estimates and stores a size B_a of an available buffer space increased after the packet transmission in step 605.

The interface buffer determines in step 610 whether the size B_a is greater than or equal to a predetermined threshold B_NRT. If B_a is greater than or equal to B_NRT, the interface buffer restarts the stopped NRT service in step 615. However, if B_a is less than B_NRT, the interface buffer continues the stop of the NRT service. The interface buffer determines in step 620 whether the size B_a is greater than or equal to a predetermined threshold B_BE. If B_a is greater than or equal to B_BE, the interface buffer restarts the stopped BE service in step 625, and than returns to step 600. However, if B_a is less than B_BE, the interface buffer continues the stop of the BE service.

Figure 7:
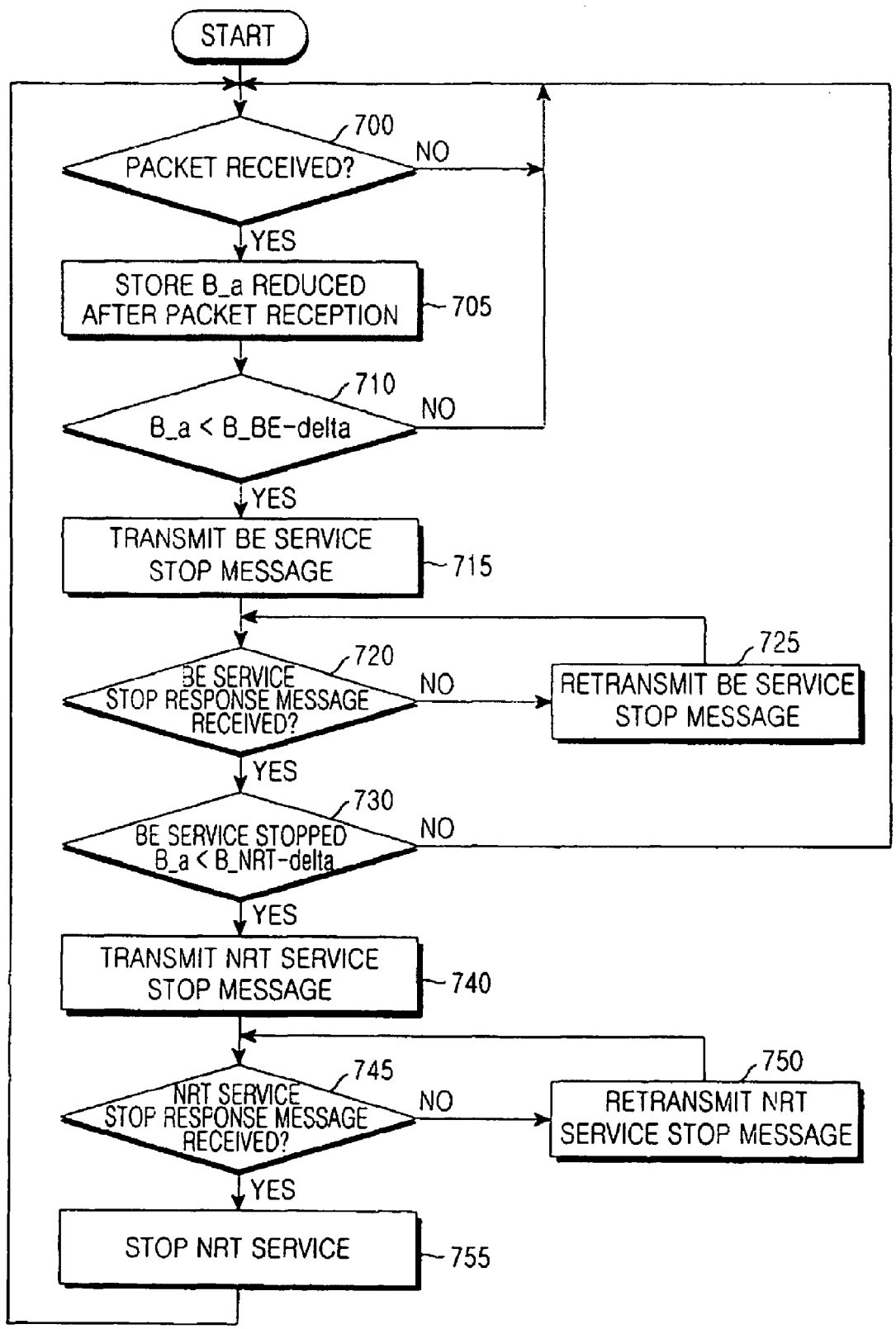
FIG. 7 illustrates an operation of an available buffer space determiner performed when a packet is input to an interface buffer according to an exemplary embodiment of the present invention.

FIG. 7 illustrates all operation of an available buffer space determiner performed when a packet is input to an interface buffer according to an exemplary embodiment of the present invention.

Referring to FIG. 7, if an interface buffer has a packet received from a processor module in step 700, the interface buffer estimates and stores a size B_a of an available buffer space reduced after the receipt of the packet in step 705.

The interface buffer determines in step 710 whether the size B_a is less than a value obtained by subtracting a delta from a preset threshold B_BE. If B_a is less than B_BE−delta, the interface buffer transmits a BE Service Stop message in step 715. However, if B_a is greater than or equal to B_BE−delta, the interface buffer returns to step 700.

The interface buffer determines in step 720 whether it has received a BE Service Stop Response message in response to the BE Service Stop message. Upon failure to receive the BE Service Stop Response message, the interface buffer retransmits the BE Service Stop message in step 725. After step 725, the interface buffer returns to step 720 to determine whether it has received a BE Service Stop Response message.

However, upon receipt of the BE Service Stop Response message, the interface buffer determines in step 730 whether the size B_a is less than a value obtained by subtracting a delta from a preset threshold B_NRT, recognizing the stop of the BE service. If B_a is greater than or equal to B_NRT-delta, the interface buffer returns to step 700. However, if B_a is less than B_NRT-delta, the interface buffer transmit an NRT Service Stop message in step 740.

The interface buffer determines in step 745 whether it has received an NRT Service Stop Response message in response to the NRT Service Stop message. Upon receipt of the NRT Service Stop Response message, the interface buffer stops the NRT service in step 755, and then returns to step 700. However, upon failure to receive the NRT Service Stop Response message, the interface buffer retransmits the NRT Service Stop message in step 750. After step 750, the interface buffer returns to step 745 to determine whether it has received an NRT Service Stop Response message.

Figure 8:
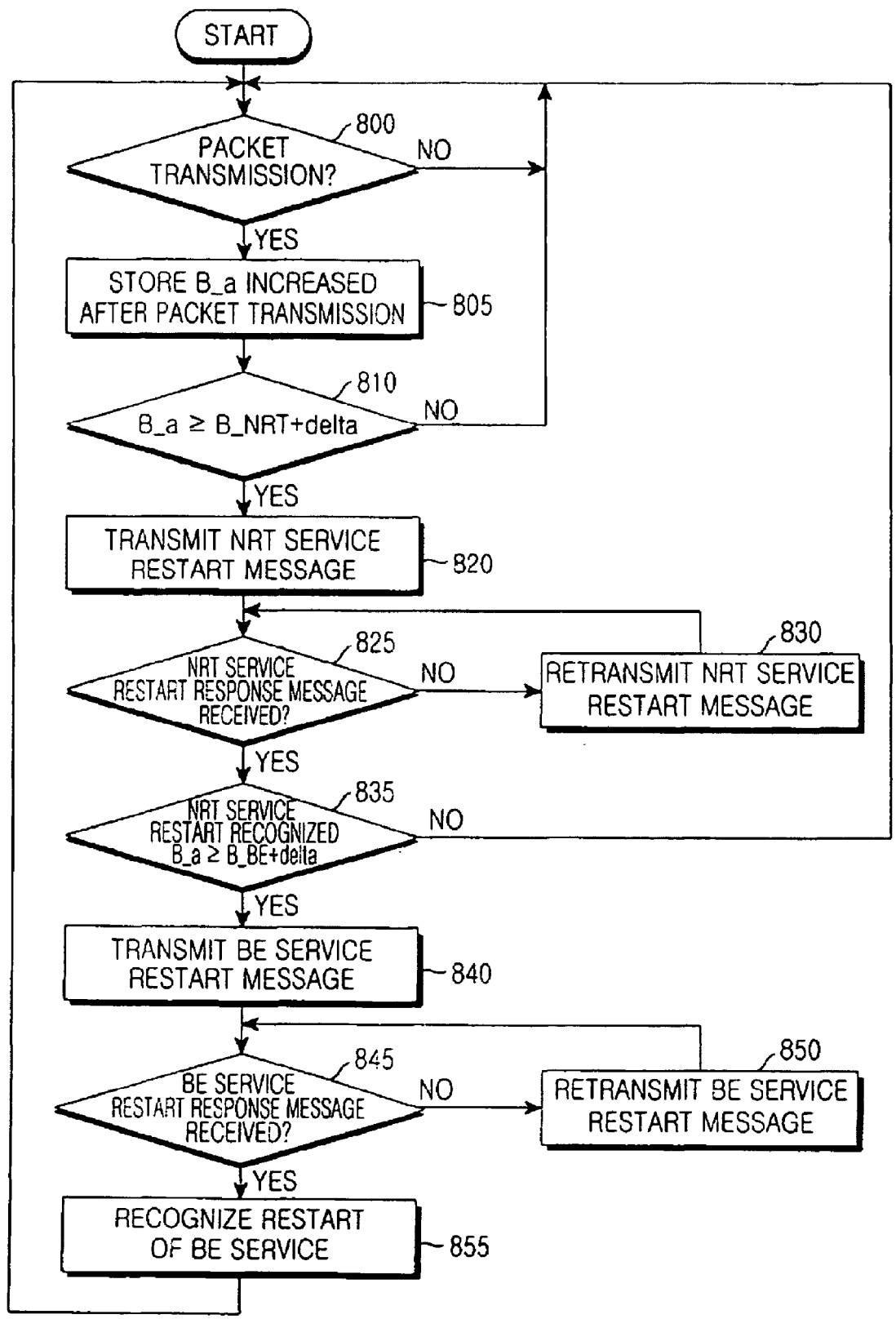
FIG. 8 illustrates an operation of an available buffer space determiner performed when a packet is output to an interface buffer according to an exemplary embodiment of the present invention.

FIG. 8 illustrates an operation of an available buffer space determiner performed when a packet is output to an interface buffer according to an exemplary embodiment of the present invention.

Referring to FIG. 8, if an interface buffer has a packet to transmit in step 800, the interface buffer estimates and stores a size B_a of an available buffer space increased after the packet transmission in step 805.

The interface buffer determines in step 810 whether the size B_a is greater than or equal to a value obtained by adding a delta to a preset threshold B_NRT. If B_a is greater than or equal to B_NRT+delta, the interface buffer transmits an NRT Service Restart message in step 820. However, if B_a is less than B_NRT+delta, the interface buffer returns to step 800.

The interface buffer determines in step 825 whether it has received an NRT Service Restart Response message in response to the NRT Service Restart message. Upon failure to receive the NRT Service Stop Response message, the interface buffer retransmits the NRT Service Restart message in step 830. After step 830, the interface buffer returns to step 825 to determine whether it has received an NRT Service Restart Response message.

However, upon receipt of the NRT Service Restart Response message, the interface buffer determines in step 835 whether the size B_a is greater than or equal to a value obtained by adding a delta to a preset threshold B_BE, recognizing the restart of the NRT service. If B_a is less than B_BE+delta, the interface buffer returns to step 800. However, if B_a is greater than or equal to B_BE+delta, the interface buffer transmits a BE Service Restart message in step 840.

The interface buffer determines in step 845 whether it has received a BE Service Restart Response message in response to the BE Service Restart message. Upon receipt of the BE Service Restart Response message, the interface buffer recognizes the restart of the BE service in step 855, and then returns to step 800. However, upon failure to receive the BE Service Restart Response message, the interface buffer retransmits the BE Service Restart message in step 850. After step 850, the interface buffer returns to step 845 to determine whether it has received and BE Service Restart Response message.

Figure 9:
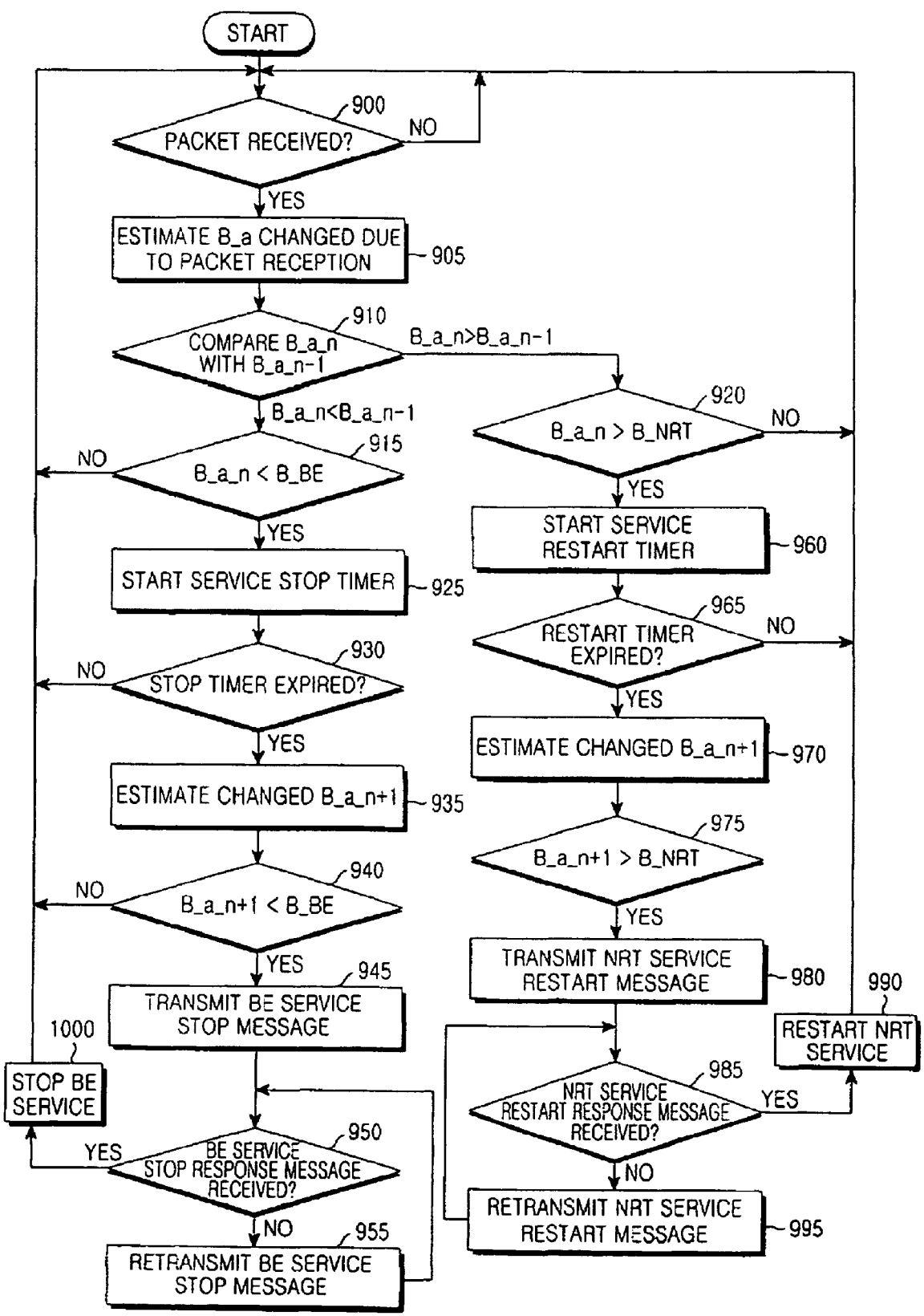
FIG. 9 illustrates an operation of an interface buffer according to an exemplary embodiment of the present invention.

FIG. 9 illustrates an operation of an interface buffer according to an exemplary embodiment of the present invention.

Referring to FIG. 9, upon receipt of a packet in step 900, an interface buffer estimates in step 905 a value of B_a_n that has changed due to reception of the packet. In step 910, the interface buffer determines whether a size B_a_n of an available buffer space changed due to the packet reception has increased or decreased from a size B_a_n−1 of a previous available buffer space.

If the size B_a_n has decreased from the size B_a_n−1, i.e., if B_a_n is less than B_a_n−1, the interface buffer proceeds to step 915. However, if the size B_a_n has increased from the size B_a_n−1, i.e., if B_a_n is greater than B_a_n−1, the interface buffer proceeds to step 920.

The interface buffer determines in step 915 whether B_a_n is less than a threshold B_BE. If B_a_n is not less than B_BE, the interface buffer returns to step 900. However, if B_a_n is less than B_BE, the interface buffer starts a Service Stop timer in step 925.

The interface buffer determines in step 930 whether the Stop timer has expired. If the Stop timer has not expired, the interface buffer returns to step 900. However, if the Stop timer has expired, the interface buffer re-estimates B_a_n considering the change in the available buffer size for the time counted by the timer in step 935 (B_a_n+1). Thereafter, if it is determined in step 940 that B_a_n+1 is less than B_BE, the interface buffer transmits a BE Service Stop message in step 945.

The interface buffer determines in step 950 whether it has received a BE Service Stop Response message in response to the BE Service Stop message. Upon receipt of the BE Service Stop Response message, the interface buffer stops the BE service in step 1000, and then returns to step 900. However, upon failure to receive the BE Service Stop Response message, the interface buffer retransmits the BE Service Stop message in step 955. After step 955, the interface buffer returns to step 950 to determine whether it has received a BE Service Stop Response message.

If the size B_a_n has increased from the size B_a_n−1, i.e., if B_a_n is greater than B_a_n−1, as determined in step 910, the interface buffer proceeds to step 920. In step 920, the interface buffer determines whether B_a_n is greater than a present threshold B_NRT. If B_a_n is not greater than B_NRT, the interface buffer returns to step 900. However, if B_a_n is greater than B_NRT, the interface buffer starts a Service Restart timer in step 960.

The interface buffer determines in step 965 whether the Restart timer has expired. If the Restart timer has not expired, the interface buffer returns to step 900. However, if the Restart timer has expired, the interface buffer re-estimates B_a_n considering the change in the available buffer size for the time counted by the timer in step 970 (B_a_n+1). Thereafter, if it is determined in step 975 that B_a n+1 is greater than B_NRT, the interface buffer transmits an NRT Service Restart message in step 980.

The interface buffer determines in step 985 whether it has received an NRT Service Restart Response message in response to the NRT Service Restart message. Upon receipt of the NRT Service Restart Response message, the interface buffer restarts the NRT service in step 990, and then returns to step 900. However, upon failure to receive the BE Service Stop Response message, the interface buffer retransmits the NRT Service Restart message in step 995. After step 995, the interface buffer returns to step 985 to determine whether it has received an NRT Service Restart Response message.

As is apparent from the foregoing description, the present invention can improve qualities of the corresponding services through service differentiation based on priorities of service classes and buffer management based on characteristics of the corresponding service traffics, can protect the higher-priority packet services from the lower-priority packet services, and can guarantee the service quality and channel efficiency. In addition, when the change in the available size of the buffer has little difference from the threshold for determining the service stop/restart, determined separately for each service class, exemplary embodiments of the present invention set a hysteresis interval or a timer, thereby preventing the unnecessary repeated switching between the service stop and the service restart. Further, exemplary embodiments of the present invention transmit a message indicating the stop/restart of the corresponding service, and retransmit the message upon failure to receive a response message in response thereto for a preset time, thereby reducing the possible signal loss.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for managing a buffer of a Radio Access Station (RAS) in a communication system, the method comprising:

setting a threshold for each of a plurality of service classes;

upon receipt of a packet at the buffer, estimating a size of an available space of the buffer after the receipt of the packet;

comparing the estimated size with a first threshold corresponding to a first service class indicative of the service of the packet;

scheduling at least one of a packet input and a packet output of the buffer according to a result of the comparison;

transmitting a first service stop message indicating a stop of the first service to a processor module;

upon receipt of a first service stop response message from the processor module, stopping the first service; and upon failure to receive the first service stop response message from the processor module for a preset retransmission time, retransmitting the first service stop message to the processor module, wherein the scheduling comprises stopping the first service and stopping inflow of the packet if the estimated size is less than the first threshold.

2. The method of claim 1, wherein the scheduling further comprises restarting the stopped inflow of the packet if the estimated size is greater than or equal to the first threshold.

3. The method of claim 2, further comprising:

transmitting a first service restart message indicating a restart of the first service to a processor module;

upon receipt of a first service restart response message from the processor module, restarting the first service; and upon failure to receive the first service restart response message from the processor module for a preset retransmission time, retransmitting the first service restart message to the processor module.

4. The method of claim 1, wherein each of the plurality of service classes comprises at least one of a Real-Time (RT) service class susceptible to a time delay, a Non-Real-Time (NRT) service class having high priority regardless of the time delay, and a Best Effort (BE) service class having no service requirement.

5. The method of claim 4, further comprising determining a total size of the buffer for guaranteeing services of the RT service class and the NRT service class.

6. The method of claim 5, further comprising determining a total size of the buffer to maximize utilization efficiency of a wireless channel for the BE service class.

7. The method of claim 1, wherein the scheduling comprises:

determining a second threshold corresponding to a minimum change for determining at least one of a stop time and a start time of the first service; and stopping the first service and stopping inflow of the packet if the estimated size is less than a difference between the first threshold and the second threshold.

8. The method of claim 7, wherein the scheduling comprises:

restarting the first service and restarting the inflow of the packet if the estimated size is greater than a sum of the first threshold and the second threshold.

9. The method of claim 1, wherein the scheduling comprises:

determining a time interval for determining at least one of a stop time and a restart time of the first service;

starting a timer which is set to the time interval, if the estimated size is less than the first threshold; and stopping the inflow of the packet if an available space size of the buffer, estimated after expiration of the timer, is less than the first threshold.

10. The method of claim 9, wherein the scheduling further comprises:

determining a time interval for determining at least one of a stop time and a restart time of the first service;

starting a timer which is set to the time interval, if the estimated available space size of the buffer is greater than the first threshold;

restarting the inflow of the packet if an available space size of the buffer, estimated after expiration of the timer, is greater than the first threshold.

11. An apparatus for managing a buffer of a Radio Access Station (RAS) in a communication system, the apparatus comprising:

an available buffer space determiner for setting a threshold for each of a plurality of service classes, for estimating, upon receipt of a packet at the buffer, a size of an available space of the buffer after receipt of the packet, for comparing the estimated size with a first threshold corresponding to a first service class indicative of the service of the packet, and for scheduling packet input/output of the buffer according to the comparison result; and a processor module for scheduling at least one of packet input and packet output of the buffer according to an output of the available buffer space determiner, wherein the available buffer space determiner:

transmits a first service stop message indicating a stop of the first service to the processor module if the estimated size is less than the first threshold;

upon receipt of a first service stop response message from the processor module, recognizes the stop of the first service; and upon failure to receive the first service stop response message from the processor module for a preset retransmission time, retransmits the first service stop message to the processor module.

12. The apparatus of claim 11, wherein the available buffer space determiner:

transmits a first service restart message indicating a restart of the stopped first service to the processor module, if the estimated size is greater than the first threshold;

upon receipt of a first service restart response message from the processor module, recognizes the restart of the first service; and upon failure to receive the first service restart response message from the processor module for a preset retransmission time, retransmits the first service restart message to the processor module.

13. The apparatus of claim 11, wherein each of the plurality of service classes comprises at least one of a Real-Time (RT) service class susceptible to a time delay, a Non-Real-Time (NRT) service class having high priority regardless of the time delay, and a Best Effort (BE) service class having no service requirement.

14. The apparatus of claim 13, further comprising a buffer size determiner for determining a total size of the buffer for guaranteeing services of the RT service class and the NRT service class.

15. The apparatus of claim 14, wherein the buffer size determiner further determines a total size of the buffer to maximize utilization efficiency of a wireless channel for the BE service class.

16. The apparatus of claim 11, wherein the available buffer space determiner:

determines a second threshold corresponding to a minimum change for determining a stop/start time of the first service;

transmits a first service stop message to the processor module if the estimated size is less than a difference between the first threshold and the second threshold; and transmits a first service restart message to the processor module if the estimated size is greater than a sum of the first threshold and the second threshold.

17. The apparatus of claim 11, wherein the available buffer space determiner:
- determines a time interval for determining a stop/restart time of the first service;
- starts a timer which is set to the time interval, if the estimated size is less than the first threshold; and
- transmits a first service stop message to the processor module if an available space size of the buffer, estimated after expiration of the timer, is less than the first threshold.

18. The apparatus of claim 17, wherein the available buffer space determiner:
- starts a timer which is set to the time interval, if the estimated size is greater than the first threshold; and
- after expiration of the timer, transmits a first service restart message to the processor module if an available space size of the buffer, estimated after expiration of the timer, is greater than the first threshold.

* * * * *